Patented Feb. 22, 1927.

1,618,376

UNITED STATES PATENT OFFICE.

HENRY J. HABER, OF CLEVELAND, OHIO, ASSIGNOR TO THE CHAMBERLAIN-HABER CHEMICAL COMPANY, OF CLEVELAND, OHIO, A CORPORATION OF OHIO.

COMPOSITION FOR OPENING STOPPED PIPES.

No Drawing.  Application filed December 15, 1919. Serial No. 345,056.

The present invention relates to a composition of matter which is preeminently useful for the purpose of opening pipes, drains, traps, etc., which may become clogged or stopped up by rags, hair, etc., in fact any animal or vegetable matter.

The composition which forms the subject matter of the present invention provides as ingredients a caustic material which attacks and disintegrates the animal or vegetable matter, and additionally comprises a material which readily gasifies particularly when heat is applied thereto so that the combined action of the composition is to disintegrate the material forming the stoppage and by the pressure of the gas evolved by the gasifying substance to assist disintegrating action of the caustic and additionally force the disintegrated material through the pipe.

A composition for the purpose which works very satisfactorily comprises essentially potassium or sodium hydrate, and paradichlorobenzol to which may be added a small amount of sodium carbonate.

The sodium carbonate in the mixture acts to assist saponification of grease which is usually present in stopped up drain pipes.

The potassium or sodium hydrate in its dry condition is a white crystalline substance and the paradichlorobenzol is also a crystalline substance when confined out of contact with the air, but upon its exposure to the air it changes from solid form to gaseous form and this change is quite rapid when heat is applied to the solid substance. The paradichlorobenzol also is a germicide and an additional favorable characteristic is that it has a pleasant odor.

The preferred proportions in which the material is combined is as follows:

16 oz. of sodium or potassium hydrate, 3 oz. of paradichlorobenzol, 3½ oz. of sodium carbonate.

The preceding composition has been found by experience to be a very desirable one but no limitation to the precise proportions is intended or necessary.

The composition is mixed in its dry form and placed in suitable containers which exclude the air so as to prevent deterioration.

In using the material it is preferable to place a suitable portion of the composition on the strainer portion of a sink or down the pipe of the drain and pour hot water on the composition. The hot water dissolves the potassium hydrate with considerable evolution of heat and the hot water also supplies sufficient heat to cause the paradichlorobenzol to rapidly gasify. The combined action of these two substances disintegrates the animal or vegetable forming the stoppage and the pressure of the gas forces the disintegrated material through the pipe.

It is preferable to hold a plate or closure member of some sort over the sink drain or over the drain pipe in connection with the use of the material, thus materially increasing the effective gas pressure within the pipe and so making it more potential in forcing out the material which forms the stoppage.

As before stated, the paradichlorobenzol is a germicide and therefore has an additional function in connection with the other use mentioned.

Having described my invention, I claim:

1. A composition for opening stopped drain pipes, comprising a caustic material which will act to disintigrate animal and vegetable matter; and paradichlorobenzol.

2. A composition for opening stopped drain pipes, comprising a material having the caustic properties of sodium hydrate and paradichlorobenzol.

3. A composition of matter comprising the following ingredients in the proportions mentioned; a material having the caustic properties of sodium hydrate 16 oz., paradichlorobenzol 3 to 4 oz., sodium carbonate approximately 3½ oz.

In testimony whereof, I hereunto affix my signature.

HENRY J. HABER.